Jan. 18, 1955
M. H. SHAMOS
2,700,110
GAMMA RAY SURVEY METER
Filed Dec. 6, 1952
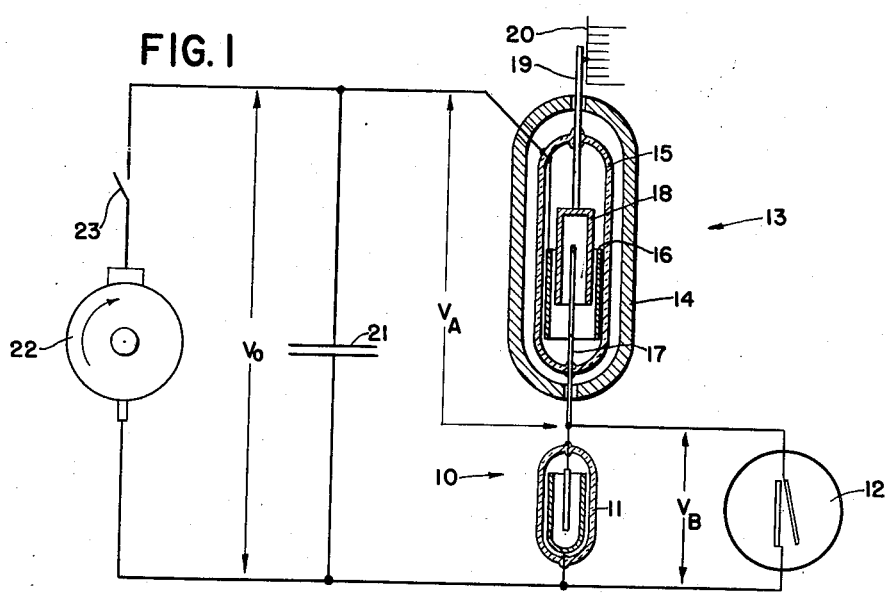
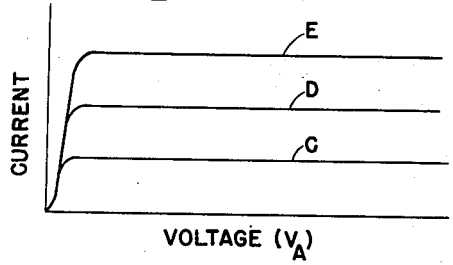
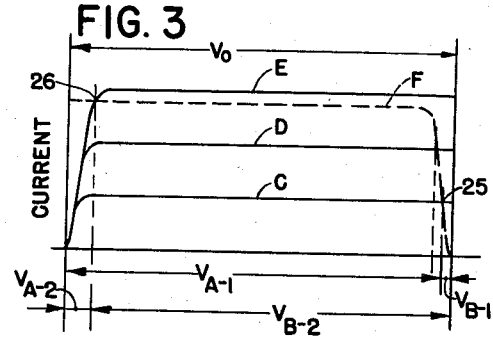
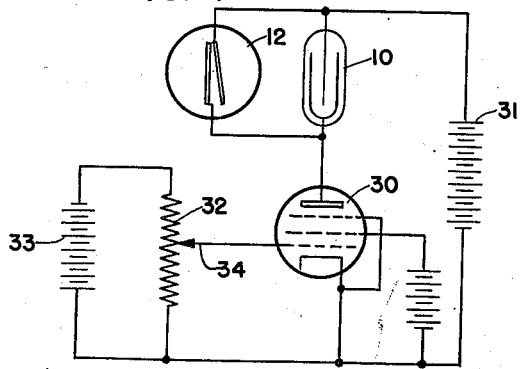
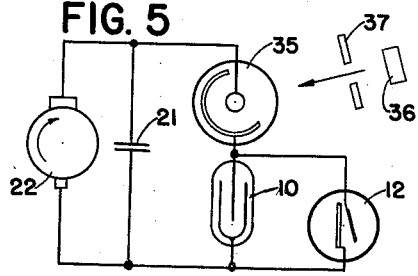
MORRIS H. SHAMOS
*INVENTOR.*
BY *Ralph E. Bitner*
ATTORNEY

2,700,110

GAMMA RAY SURVEY METER

Morris H. Shamos, New York, N. Y., assignor to Chatham Electronics Corporation, Newark, N. J.

Application December 6, 1952, Serial No. 324,525

14 Claims. (Cl. 250—83.6)

This invention relates to survey meters for measuring penetrating radiation such as alpha, beta, and gamma rays. It has particular reference to a combination of an ion chamber and a constant current component, the characteristics of which may be controlled by a calibrated mechanical means.

The use of ion chambers for measuring penetrating radiation is well known and these devices have been applied in many circuits and with many different forms of indicating instruments. It has been customary to measure the voltage across an ion chamber or the current passing through it in order to obtain a value which is proportional to the ionizing properties of incident radiation. Such combinations are reliable only if the indicating meter is correctly calibrated and any variation of calibration will obviously produce erroneous results. The present invention employs a voltage indicating instrument which is not calibrated, the value of penetrating radiation being read on a calibrated scale which is part of an adjustable constant current device.

One of the objects of this invention is to provide an improved survey meter for penetrating radiation which avoids one or more of the disadvantages and limitations of prior art arrangements.

Another object of the invention is to provide a null instrument which does not depend upon the calibration of a sensitive indicating instrument.

Another object of the invention is to reduce the cost of survey meters by providing an arrangement having few components which are easy to manufacture and simple to calibrate.

Another object of the invention is to provide a survey meter which maintains its calibration within a wide range of temperature variation.

The invention comprises an ion chamber connected in series with a constant current circuit component. A voltage is applied across these two elements and a voltage indicating instrument is connected across the ion chamber terminals. Means are provided for varying the constant current value passed by the constant current device. Measurement of penetrating radiation is obtained by noting the setting of the constant current device when the voltage indicating means changes abruptly.

For a better understanding of the present invention, together with other and further objects, thereof, reference is made to the following description taken in connection with the accompanying drawings.

Fig. 1 is a schematic diagram of connections showing an ion chamber for sensing penetrating radiation connected in series with a second ion chamber, the constant current value of which is mechanically adjustable.

Fig. 2 is a chart showing the variations of current with applied voltage of the constant current device.

Fig. 3 is a chart showing the characteristic curves of Fig. 2 in combination with the characteristic curves of an ion chamber.

Fig. 4 is a schematic diagram of connections similar to Fig. 1 but showing a pentode vacuum tube as the constant current device.

Fig. 5 is a schematic diagram of connections similar to Fig. 1 but showing a photoelectric tube connected in place of the constant current device.

Referring now to Fig. 1 an ion chamber 10 is employed for sensing penetrating radiation. Enclosed within an envelope 11 are two electrodes and an ionizable gas. A voltage indicating means 12 is connected across the ion chamber 10 and indicates an approximate value of voltage across this device. Volt meter 12 is not calibrated and may comprise a gold leaf electroscope, a vane type instrument, or any other type of voltage indicating device which has a very high resistance.

Connected in series with ion chamber 10 is a constant current device 13 which in Fig. 1 is shown as an ion chamber having a built-in source of ionization. This device has been described and illustrated in co-pending patent application by Morris H. Shamos, filed November 22, 1952, Serial Number 322,020. This device comprises a shield 14, an envelope 15, and two electrodes within the envelope, one of which is a cylindrical conductor 16 and the other of which is a centrally aligned wire 17. In order to provide a constant source of ionization a small amount of radium or other suitable ionizing substance is spread evenly on the inside surface of cylinder 16. An adjustable shield 18 is connected to a mechanical coupling means 19 which can be controlled from the outside of shield 14. By operating this mechanical means shield 18 can be positioned inside the cylindrical electrode 16 and will mask a predetermined amount of the ionizing radiation given off by the radioactive material on the inside surface. The setting of mask 18 is indicated on a scale 20 so that the constant current characteristics of this device are always available.

The above described circuit components are connected to a capacitor 21 which may be charged by a suitable voltage generator 22 connected across the capacitor terminals by a switch 23. The voltage generator 22 may be an electrostatic generator such as described in U. S. Patent Number 2,577,542, issued December 4, 1951, to Jean Roudaut.

The characteristics of constant current device 13 are indicated in Fig. 2 where curve E represents the relationship between the applied voltage $V_A$ and the current passing between the two electrodes 16 and 17. This curve, having the highest current value, represents the values when the mask 18 is fully withdrawn from the inner surface of the radioactive material on cylinder 16. Curve D represents similar current and voltage values when the mask 18 covers about one-third the area of the radioactive substance and curve C represents similar values when the mask 18 covers about two-thirds of the radioactive material.

When the two ion chambers 10 and 13 are connected in series arrangement the voltages $V_A$ and $V_B$ across the two chambers must be equal to the terminal voltage Vo. This condition may be represented graphically, as shown by the chart in Fig. 3. In this figure the characteristic curve F of ion chamber 10 is drawn in an inverted direction so that the sum of the two voltages will always be equal to the terminal voltage. In order to explain the voltage distribution across these two chambers let it first be assumed that the mask 18 has been inserted so that it masks about two-thirds of the radiation in tube 13 thereby operating on curve C. Let it also be assumed that enough penetrating radiation is being received by chamber 10 so that it is operating on curve F. The voltage distribution is obviously obtained by determining the point of intersection 25 of the two curves and therefore the voltage across ion chamber 10 is $V_{B-1}$ while the voltage across the chamber 13 is $V_{A-1}$. Now let it be assumed that the operator withdraws mask 18, moving successively from curve C to curve D and then to curve E. As soon as the current value becomes greater than curve F the operating voltages will shift to the new intersection 26 and the voltage ratio is thereby changed abruptly to a value which is considerably different from its preceding value. The voltage now existing across the ion chamber 10 is represented in Fig. 3 by the value $V_{B-2}$ while the voltage across chamber 13 is shown by the value $V_{A-2}$.

To operate this circuit arrangement in the field the following procedure is contemplated. The mask 18 is inserted within electrode 16 so that a small amount of radioactive material is available to ionize the gas within envelope 15. Then capacitor 21 is charged to a predetermined voltage by generator 22. Under these circumstances the voltage indicator 12 will show a maximum reading because ion chamber 13 contains considerably less resistance than ion chamber 10, it being assumed that there is no penetrating radiation at the station where the device is charged and tested. In this charged condition the survey meter is removed to the field or to any locality where penetrating radiation may exist. As soon as penetrating radiation above a minimum amount is incident upon the electrodes of ion chamber 10 the volt meter 12 will abruptly drop from its maximum indicated value to a very small value thereby signaling the operator that radiation exists and a measurement should be made. To obtain the exact amount of radiation the operator withdraws mask 18 slowly from the inside surface of electrode 16 and at the same time watching the indicating means of volt meter 12. As soon as the volt meter indicates an abrupt increase in voltage the operator reads the indicated value on scale 20 and thereby determines the correct amount of the incident radiation.

In the above description a simplified form of ion chamber 13 has been shown. It is to be understood that any of the types of ion chambers shown and described in the above mentioned application may be used. These types include ion chambers having masks which can be turned by a magnetic means, shifted in an axially direction by screw-operated means, and other forms of controllable masks which can be operated by mechanical means coupled by flexible diaphragms and bellows.

Referring now to Fig. 4 a pentode vacuum tube 30 is connected with its anode-cathode circuit in series with an ion chamber 10 and a source of potential 31. The pentode is supplied with the usual voltages and connections for the second and third grids. The first or control grid is connected to a voltage divider 32 supplied by a source of potential 33. In this condition the pentode tube passes a constant anode current which is almost independent of the anode voltage and therefore has about the same circuit characteristics as the shielded ion chamber 13 of Fig. 1. An electrostatic voltmeter 12 is connected across the ion chamber 10 and registers the abrupt change of potential which occurs when the constant current of the pentode 30 is adjusted to be more than the current through the ion chamber. The constant current of the pentode may be adjusted in a number of ways, the change of voltage on the control grid being the most convenient and having the greatest range. Since there is no charging cycle and no capacitor, the operation comprises the adjustment of contact point 34 on voltage divider 32 until an abrupt change in voltage is registered by the voltmeter 12; then the amount of penetrating radiation is read off a calibrated scale (not shown) on the voltage divider.

Fig. 5 is a diagram of connections similar to Fig. 1 but using a photoelectric cell 35 instead of the ion chamber 13. A photoelectric has the same constant current characteristics as a pentode or ion chamber as long as the illumination is constant. To this end a source of light 36 is provided which shines on the cathode of the photocell through a calibrated adjustable diaphragm 37. The source of light may be a phosphorescent substance mixed with a small quantity of radium, such as radium paint. The diaphragm may be an iris diaphragm such as is used on cameras with a scale on the barrel. The scale is calibrated by testing with known sources of penetrating radiation and the results marked on the scale.

To operate this device, the diaphragm is first opened to its largest diameter and the generator 22 turned to charge capacitor 21 and show a reading on voltmeter 12. Then the diaphragm 37 is closed and the instrument is exposed to sources of penetrating radiation of unknown intensity. The diaphragm is opened until the meter 12 shows an abrupt increase and at this condition the scale is read to determine the radiation intensity.

It should be pointed out that the arrangements shown in Figs. 1, 4, and 5 are not dependent upon the value of voltage applied as long as it is above a value which causes a good deflection on the voltmeter and as long as the applied voltages are within the constant current region of the discharge devices used.

Circuit arrangements which use a chargeable capacitor, such as shown in Figs. 1 and 5 are best carried in the field with one of the series devices set at its lowest current level. For example, the mask 18 should be inserted all the way into chamber 15 when a reading is not being taken. This conserves the charge on the capacitor and eliminates excessive charging.

While there have been described and illustrated specific examples of the invention, it will be evident that various changes and modifications can be made therein without departing from the spirit of the invention which should be limited only by the scope of the appended claims.

I claim:

1. A survey meter for measuring the intensity of penetrating radiation comprising, an ion chamber connected in series with a constant current device, a source of potential connected across said chamber and constant current device, a voltmeter connected across the ion chamber, and calibrated means for varying the constant current characteristics of said constant current device.

2. A survey meter for measuring the intensity of penetrating radiation comprising, an ion chamber containing an ionizable gas connected in series with a constant current device, a source of potential connected across said chamber and constant current device, means for measuring the voltage across either one of the series-connected devices, and calibrated means for varying the constant current characteristics of said constant current device.

3. A survey meter for measuring the intensity of penetrating radiation comprising, an ion chamber containing an ionizable gas connected in series with a constant current device, said constant current device including adjustable means for varying the constant current characteristics, a source of potential connected across said chamber and constant current device, means for measuring the voltage across the ion chamber, and a calibrated scale for said adjustable means for reading the radiation intensity when said voltage measuring means indicates an abrupt change.

4. A survey meter for measuring the intensity of penetrating radiation comprising, an ion chamber containing an ionizable gas, a constant current device including adjustable means for varying its constant current characteristics, a source of potential connected across said chamber and said constant current device in series, an electrostatic voltmeter connected across the ion chamber for indicating the applied voltage, and a calibrated measuring device secured to said adjustable means for noting the indicated radiation intensity when the electrostatic voltmeter changes abruptly.

5. A survey meter for measuring the intensity of penetrating radiation comprising, an ion chamber containing an ionizable gas; a constant current device comprising an envelope containing two electrodes, a gas, and a source of ionizing radiation; said constant current device including an adjustable means for varying its constant current characteristics, a source of potential connected across said chamber and said constant current device in series, an electrostatic voltmeter connected across the ion chamber for indicating the applied voltage, and a calibrated measuring device secured to said adjustable means for noting the indicated radiation intensity when the electrostatic voltmeter changes abruptly.

6. A survey meter for measuring the intensity of penetrating radiation comprising; an ion chamber containing an ionizable gas; a constant current device comprising an envelope containing two electrodes, a gas, a source of ionizing radiation, and an adjustable means for varying the quantity of ionizing radiation within the envelope; a source of constant potential connected across said chamber and said constant current device in series, an electrostatic voltmeter connected across the ion chamber for indicating the applied voltage, and a calibrated measuring device secured to said adjustable means for noting the indicated radiation intensity when the electrostatic voltmeter changes abruptly.

7. A survey meter for measuring the intensity of penetrating radiation comprising; an ion chamber containing an ionizable gas; a constant current device comprising an envelope containing two electrodes, a gas, a source of ionizing radiation, and an adjustable mask; said mask positioned within the envelope in close proximity to the source of ionizing radiation whereby it can be moved to intercept a portion of said radiation; a source of constant potential connected across said chamber and said constant current device in series, an electrostatic voltmeter connected across the ion chamber for indicating the applied voltage, and a calibrated measuring device secured to said mask for noting the indicated radiation intensity when the electrostatic voltmeter changes abruptly.

8. A survey meter for measuring the intensity of penetrating radiation comprising; an ion chamber containing an ionizable gas; a constant current device comprising an envelope containing two electrodes, a gas, a source of ionizing radiation, and an adjustable mask; said mask positioned within the envelope in close proximity to the source of ionizing radiation whereby the mask can be moved to intercept a portion of said radiation; said mask adjustable by a means outside the envelope which is coupled to the mask by magnetic means; a source of constant potential connected across said chamber and said constant current device in series, an electrostatic voltmeter connected across the ion chamber for indicating the applied voltage, and a calibrated measuring device secured to the means outside the envelope for noting the indicated radiation intensity when the electrostatic voltmeter changes abruptly.

9. A survey meter for measuring the intensity of penetrating radiation comprising; an ion chamber containing an ionizable gas; a constant current device comprising an envelope containing an anode and a photocathode, and a constant source of light; a source of constant potential connected across said chamber and said constant current device in series, an electrostatic voltmeter connected across the ion chamber for indicating the applied voltage, and a calibrated measuring device secured to a means for varying said source of light, said measuring device indicating the value of radiation intensity when the electrostatic voltmeter changes abruptly.

10. A survey meter for measuring the intensity of penetrating radiation comprising; an ion chamber containing an ionizable gas; a constant current device comprising an envelope containing an anode and a photocathode, and a constant source of light; a source of constant potential connected across said chamber and said constant current device in series, an electrostatic voltmeter connected across the ion chamber for indicating the applied voltage, a calibrated light-varying device positioned between the source of light and said photocathode, and a measuring device secured to the light-varying device which indicates the value of radiation intensity applied to the ion chamber when the electrostatic voltmeter changes abruptly.

11. A survey meter for measuring the intensity of penetrating radiation comprising; an ion chamber containing an ionizable gas; a constant current device comprising an envelope containing an anode and a photocathode, and a constant source of light; a source of constant potential connected across said chamber and said constant current device in series, an electrostatic voltmeter connected across the ion chamber for indicating the applied voltage, a calibrated iris diaphragm positioned between the source of light and said photocathode, and a measuring device secured to the iris diaphragm which indicates the value of radiation intensity applied to the ion chamber when the electrostatic voltmeter changes abruptly.

12. A survey meter for measuring the intensity of penetrating radiation comprising; an ion chamber containing an ionizable gas; a constant current device comprising an envelope containing an anode and a photocathode, and a constant source of light; a source of constant potential connected across said chamber and said constant current device in series, an electrostatic voltmeter connected across the ion chamber for indicating the applied voltage, a calibrated iris diaphragm positioned between the source of light and said photocathode, and a measuring device secured to the iris diaphragm which indicates the value of radiation intensity applied to the ion chamber when the electrostatic voltmeter changes abruptly, said constant source of light comprising a mixture of radioactive material and fluorescent material.

13. A survey meter for measuring the intensity of penetrating radiation comprising; an ion chamber containing an ionizable gas; a constant current device comprising the anode-cathode circuit of a pentode electron discharge device; a source of constant potential across the ion chamber and the pentode in series, an electrostatic voltmeter connected across the ion chamber for indicating the applied voltage, an adjustable voltage applied to a control electrode in said pentode, and a calibrated measuring device coupled to said adjustable voltage which indicates the value of radiation intensity applied to the ion chamber when the electrostatic voltmeter changes abruptly.

14. A survey meter for measuring the intensity of penetrating radiation comprising; an ion chamber containing an ionizable gas; a constant current device comprising the anode-cathode circuit of a pentode electron discharge device; a source of constant potential connected across the ion chamber and the pentode in series, an electrostatic voltmeter connected across the ion chamber for indicating the applied voltage, an adjustable voltage applied to a control electrode in said pentode, and a calibrated measuring device coupled to said adjustable voltage which indicates the value of radiation intensity applied to the ion chamber when the electrostatic voltmeter changes abruptly; said adjustable voltage obtained from a voltage divider, the end terminals of which are connected to a constant potential source.

References Cited in the file of this patent

UNITED STATES PATENTS

| | | |
|---|---|---|
| 1,961,717 | Thomas | June 5, 1934 |
| 2,088,584 | Bucky | Aug. 3, 1937 |
| 2,222,452 | Trost | Nov. 19, 1940 |
| 2,531,804 | Carlin et al. | Nov. 28, 1950 |
| 2,634,609 | Obermaier | Apr. 14, 1953 |